(No Model.)
M. GARLAND & C. M. PRESCOTT.
EXPANSIBLE CHAIN WHEEL.
No. 583,799. Patented June 1, 1897.
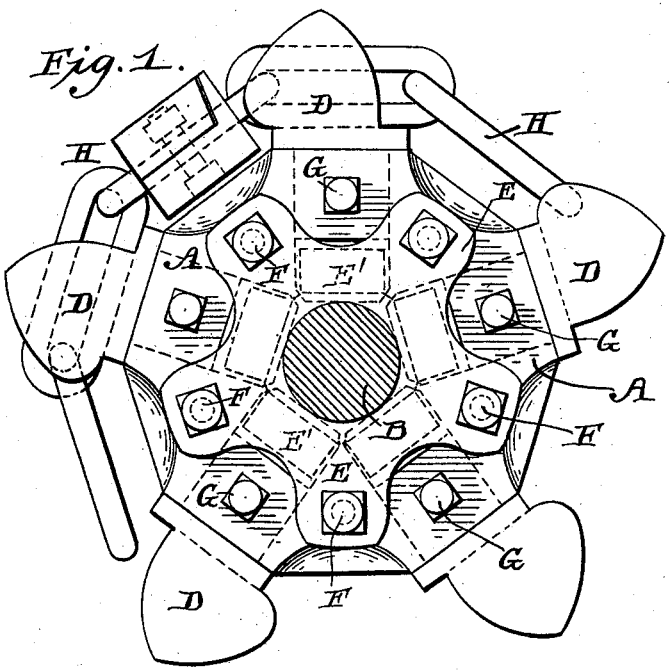
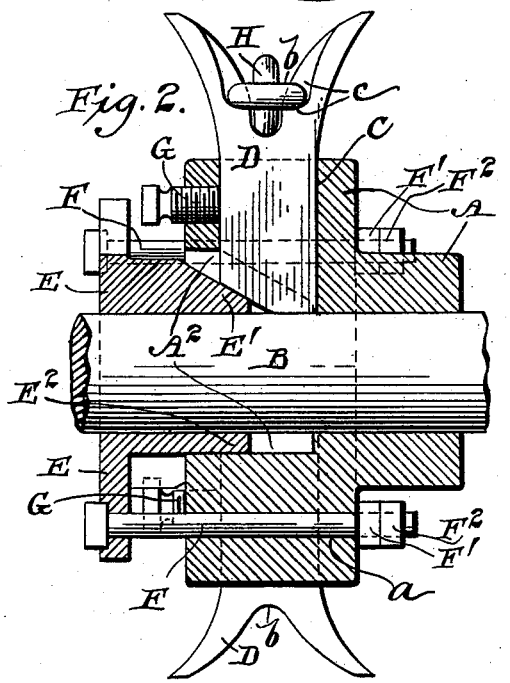
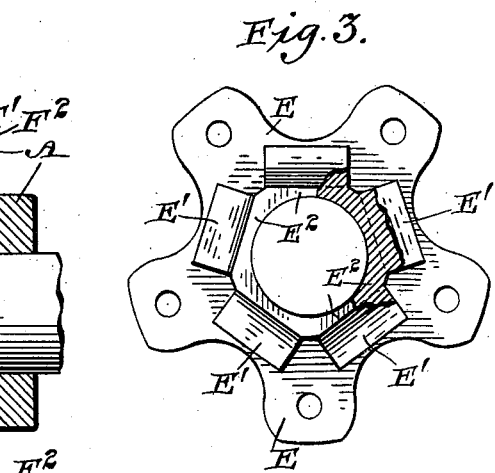

United States Patent Office.

MICHAEL GARLAND AND CHARLES M. PRESCOTT, OF BAY CITY, MICHIGAN, ASSIGNORS TO SYRENA L. GARLAND, OF SAME PLACE.

EXPANSIBLE CHAIN-WHEEL.

SPECIFICATION forming part of Letters Patent No. 583,799, dated June 1, 1897.

Application filed December 28, 1896. Serial No. 617,232. (No model.)

*To all whom it may concern:*

Be it known that we, MICHAEL GARLAND and CHARLES M. PRESCOTT, citizens of the United States, residing at Bay City, in the county of Bay and State of Michigan, have invented certain new and useful Improvements in Expansible Chain-Wheels; and we do hereby declare the following to be a full, clear, and exact description of the invention, such as will enable others skilled in the art to which it appertains to make and use the same.

This invention relates to expanding chain-wheels in which all of the teeth in a wheel are thrown out or expanded radially at one movement equally until the desired diameter is obtained, and so that the teeth in the wheel have the desired pitch to properly engage and match the pitch of the chain. In practice and in the use of chains we have found that there is more or less wear on the chain and that it soon loses its original pitch, and this continues during the life of the chain; and whereas chain-wheels are usually constructed with fixed or stationary teeth these teeth are constantly wearing down and becoming smaller in diameter and shorter in pitch, and it must be plain to all that the wear of the chain in one direction and the wear of the wheels in another or the opposite direction must almost at the start cause a misfit between the chain and the wheel; hence the cause of so much trouble in the running of chains and sprocket-wheels.

To overcome this serious difficulty, our invention consists in providing a novel expansion-wheel for use with driving-chains, said chain-wheel being constructed with a hub or body portion having independent teeth adapted at their outer ends for receiving a driving-chain and at their inner ends for bearing upon a series of connected wedges, and provided with radial openings extending from its eye or driving-shaft opening and in which said teeth are inserted, and with wedge-shaped openings in one of its faces, and with connected wedges inserted in said openings and which come in contact with the periphery of the driving-shaft of the chain-wheel and with the angled inner ends of the teeth, so that when the plate to which the wedges are connected is acted upon by draw-bolts the teeth will be forced outward in said openings to the extent required to compensate for wearing away of the teeth or the chain, the construction also being such that the draw-bolts can be locked by jam-nuts and the teeth held in their adjusted positions by set-screws as well as by the wedges and the draw-bolts.

Our invention further consists in certain novel features of construction, combinations, and arrangements of parts, as will be hereinafter described and claimed.

In the accompanying drawings, Figure 1 is an end view of our improved expansible chain-wheel. Fig. 2 is a vertical section of the same. Fig. 3 is a side elevation of the draw-bolt plate, showing the wedges thereon.

In the drawings, A designates the hub or body portion of our chain-wheel. This body portion is centrally bored, so that it may be fitted upon a driving-shaft B. On one face or end a reduced sleeve portion is formed, and outside this sleeve a series of draw-bolt passages $a$ are bored through the hub or body portion. On the other face of the said hub or body portion a series of passages $A^2$ are provided. Radially from the passage in which the shaft fits to the periphery of the hub or body portion a series of passages C are formed. E represents a draw-bolt plate provided with sleeve-like portion $E^2$, extending from its inner face, and with a series of conical edges $E'$, extending upward from said sleeve. This plate, with its sleeve-like portion, is centrally bored, and it, with its sleeve portion and wedges, is fitted loosely upon the drive-shaft and connected to the hub or body portion by draw-bolts F, which enter the passages $a$ and pass through the hub or body portion and receive nuts $F'$ and locking or jam nuts $F^2$ on their screw-threaded ends. The wedges and sleeve-like portion enter the passages $A^2$ and extend some distance into the hub or body portion, the sleeve-like portion bearing loosely upon the driving-shaft.

D are chain-teeth bifurcated at their outer ends and formed with grooves $b$ and shoulders $c$, so as to afford a proper support for a driven chain H, which chain may be of ordinary construction, as shown. The inner ends of these teeth are cut away at their inner ends for a portion of their width on an angle of about twenty-five degrees, or on an angle corresponding with that of the contacting surfaces of the conical wedges. Each tooth is fitted in a passage C, and when the chain-wheel is new may rest upon the driving-shaft, those portions of them which are not cut on an angle being parallel with the driving-shaft.

G are set or binding screws passed through one face of the hub or body portion and binding against the teeth, so as to hold them firmly in position and prevent them from falling out when the upper portion of the chain-wheel becomes inverted or stands below the driving-shaft.

From the aforegoing description it will be seen that the teeth are radially expansible; that they can be accurately fitted in the passages provided for them in the hub or body portion, so as to be in true alinement and of equal radius from the center of the driving-shaft, and that the teeth are angled at their base or inner ends, or at angle of about twenty-five degrees where they engage or contact with the conical or tapered surfaces of the wedges; that the draw-plate which carries the wedges can be provided with the requisite number of angles to correspond with the number of teeth in the chain-wheel, and that the hub or body portion is provided about the center on one side with openings corresponding with and matching the angled or wedge-shaped projections of the draw-plate, which projections engage the angled surfaces on the base or inner ends of the teeth. To move the teeth out radially and thereby equally increase the diameter of that portion of the wheel on which the chain H bears, the draw-plate is forced inward by the draw-bolts, which operation causes the wedges to glide in under the angled surfaces of the teeth and force all of the teeth out to an equal extent. When the teeth are moved out the proper distance, the nuts F' and F² are screwed up and the whole locked firmly, and then the set or binding screws are turned up and caused to bind against the teeth. To make subsequent adjustments of the teeth for the expansion of the diameter of the chain-bearing portions of the wheel, the set-screws and the locking and jam nuts should be turned back, then the draw-bolts operated until the conical wedges have forced all the teeth out the required distance and the desired expansion secured. Now turn up the locking and jam nuts and set-screws as before, so as to hold the draw-plate and cone wedges and the teeth in their adjusted positions and prevent the teeth from falling out as the wheel revolves.

What we claim is—

1. In an expansion-wheel for driving-chains, the combination with a hub provided with radial openings extending from its eye or driving-shaft opening and with openings in one of its faces, independent teeth adapted at their outer ends for receiving a drive-chain and at their inner ends for bearing on a series of connected wedges, said teeth being adapted to be inserted in the said radial openings, connected wedges inserted in said openings which come in contact with the periphery of the driving-shaft of the chain-wheel and with the angled or tapered inner ends of the teeth, draw-bolts for acting upon the plate to which the said wedges are connected whereby the teeth will be forced outward in said radial openings to the extent required to compensate for the wearing away of the teeth or chain, locking-nuts upon said draw-bolt and set-screws in said hub, substantially as described.

2. An expansible chain-wheel constructed with independent adjustable teeth and means for adjusting all of the teeth simultaneously and uniformly, said means comprising a plate having a plurality of separated projecting wedges integral therewith and having flat engaging surfaces adapted to engage corresponding flat surfaces upon the inner ends of the said teeth and means for securing the teeth in their adjusted positions, substantially as described.

In testimony whereof we hereunto affix our signatures in presence of two witnesses.

MICHAEL GARLAND.
CHARLES M. PRESCOTT.

Witnesses:
MORRIS L. COURTRIGHT,
RICHARD A. MCKAY.